(12) United States Patent
Snyderman et al.

(10) Patent No.: US 7,973,949 B2
(45) Date of Patent: *Jul. 5, 2011

(54) SYSTEM AND METHOD FOR DEVELOPING A PRINT SHOP CONFIGURATION

(75) Inventors: David Snyderman, Brighton, NY (US); Timothy W. Jacobs, Fairport, NY (US); Jie Lin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 956 days.

This patent is subject to a terminal disclaimer.

(21) Appl. No.: 11/495,855

(22) Filed: Jul. 28, 2006

(65) Prior Publication Data

US 2008/0030766 A1    Feb. 7, 2008

(51) Int. Cl.
*G06F 3/12*    (2006.01)

(52) U.S. Cl. ........ 358/1.13; 358/1.15; 358/1.1; 358/1.9; 705/8; 705/9; 709/102; 709/105

(58) Field of Classification Search ................ 358/1.13, 358/1.15, 1.1, 1.14, 1.16, 1.11, 1.9, 1.12; 705/8, 9; 718/102, 104, 106; 709/102, 105
See application file for complete search history.

(56) References Cited

U.S. PATENT DOCUMENTS

| | | | |
|---|---|---|---|
| 6,573,910 B1 | 6/2003 | Duke et al. | |
| 7,051,328 B2 | 5/2006 | Rai et al. | |
| 7,079,266 B1 | 7/2006 | Rai et al. | |
| 2002/0129081 A1* | 9/2002 | Rai et al. | 709/102 |
| 2003/0149747 A1* | 8/2003 | Rai et al. | 709/219 |
| 2005/0065830 A1 | 3/2005 | Duke et al. | |
| 2007/0019228 A1* | 1/2007 | Rai et al. | 358/1.15 |

\* cited by examiner

*Primary Examiner* — Benny Q Tieu
*Assistant Examiner* — Martin Mushambo
(74) *Attorney, Agent, or Firm* — Fay Sharpe LLP

(57) ABSTRACT

A system is provided for forming a print shop configuration with a first set of equipment, the first set of equipment being derived from a second set of equipment from a first print shop and a third set of equipment from a second print shop. The system includes a manager and application, the manager and application working together to generate a list of at least some of all possible print shop configurations that could be formed with a selected number of cells. The cells are populated with selected pieces of equipment from the second and third sets of multiple pieces of equipment. A criterion is used to select, from the list of possible print shop configurations, the print shop configuration with the first set of equipment.

19 Claims, 5 Drawing Sheets

SYSTEM AND METHOD FOR DEVELOPING A PRINT SHOP CONFIGURATION

RELATED APPLICTIONS

Cross-reference is made to the following copending, commonly assigned applications: U.S. patent application Ser. No. 11/495,857, filed Jul. 28, 2006, by Snyderman et al., entitled "SYSTEM AND METHOD FOR DEVELOPING A CONFIGURATION FOR A COMBINATION OF TWO OR MORE PRINTSHOPS", U.S. patent application Ser. No. 11/495,393, filed Jul. 28, 2006, by Snyderman et al., entitled "SYSTEM AND METHOD FOR DEVELOPING A PRINTSHOP CONFIGURATION", U.S. patent application Ser. No. 11/495,855, filed Jul. 28, 2006, by Snyderman et al., entitled "SYSTEM AND METHOD FOR DEVELOPING A PRINTSHOP CONFIGURATION".

BACKGROUND AND SUMMARY

The disclosed embodiments relate to a print shop configuration system, and, more particularly, to an approach in which a print shop configuration is optimally selected from a list of possible print shop configurations with a criterion.

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total volume of print jobs.

When a new print job arrives, the print job sequentially passes through each department until the print job is completed. The conventional approach leads to significant time delays and increased work-in-progress and inventory costs.

In accordance with an improved approach, a print shop may be reorganized into autonomous cells as disclosed in U.S. patent application Ser. No. 09/706,430 by Rai et al. (filed Nov. 3, 2000), the pertinent portions of which are incorporated by reference. For each autonomous cell in a corresponding group, resources (e.g., equipment or stations) are grouped together according to different job classes commonly encountered by a specific print shop.

The above-mentioned techniques for configuring print shops can be very effective in optimizing a print shop configuration, provided the designer of the configuration has a comprehensive grasp of both a significant number of print shop configurations available for use, and a criteria for selecting a suitable configuration from the significant number of configurations. It should be noted that having a comprehensive grasp of available print shop configurations can be rather challenging since the number of possible configurations can be quite significant for print shops employing significant number of equipment pieces (i.e., "stations") and/or cells. In addition, competing goals of different customers of the print shop might make it difficult to determine the appropriate criteria for use in determining optimal print shop performance. It would be desirable to provide a print shop configuration technique permitting a configuration designer to be apprised of a significant number of print shop configurations and to apply a criterion for obtaining a suitable print shop configuration from such significant number of print shop configurations.

In accordance with one aspect of the disclosed embodiments, there is provided a print shop configuration system for developing a print shop configuration. The print shop configuration includes at least one print processing related cell with at least one print processing related station. The print shop configuration system includes: (A) a memory for storing a list of substantially all possible print shop configurations that can be formed with at least one print processing related cell and at least one print processing related station; and (B) a print shop configuration manager, said print shop configuration manager operating cooperatively with an application for, (1) simulating a processing of each print job of a set of print jobs with each possible print shop configuration set forth in the list of all possible print shop configurations, (2) calculating a criteria value for each simulation performed in (B)(1), and (3) selecting, with the criteria values calculated in (B)(2), one of the print shop configurations from the list of substantially all possible print job configurations.

In accordance with another aspect of the disclosed embodiments, there is provided a method for developing a print job processing configuration. The print job processing configuration includes at least one print job processing related cell with at least one print job processing related station. The method includes: (A) storing a list of substantially all possible print job processing configurations that can be formed with at least one print job processing related cell and at least one print job processing related station; (B) simulating a processing of each print job of a set of print jobs with each possible print job processing configuration set forth in the list of all possible print job processing configurations; (C) calculating a criteria value for each simulation performed in (B); and (D) selecting, with the criteria values calculated in (C), one of the print job processing configurations from the list of substantially all possible print job processing configurations.

The above described features, along with other features described below, will become more readily apparent to those of ordinary skill in the art by reference to the following detailed description and accompanying drawings.

The following description of exemplary embodiments is directed to an approach for developing configurations in a print shop environment. However, it should be understood that the principles and techniques described herein might be used in other document production-related environments such as mailrooms, document scanning centers and the like.

For the purposes of discussion hereinafter, a "print shop" refers to a grouping of printing resources. The print shop may be a freestanding entity such as a commercial printer or may be part of a corporation or other entity. A "print job" refers to a logical unit of work that is to be completed for a customer. For example, a request to make 10 copies of a book is a print job. Similarly, a request to make 100 copies of a single document is a print job. A production function can be any operation or processing step involved in the processing of the print job. For example, a production function can be black & white printing, color printing, scanning, or packaging.

Further description of basic print shop configuration development is provided in the above-mentioned U.S. patent application Ser. No. 09/706,430 by Rai et al. As indicated by the '430 Patent Application, configuration resources, such as printers, copiers, cutters, shrink-wrappers and other varieties of equipment, may be partitioned into autonomous cells to form a print shop configuration. When a print job arrives, it may be assigned to a particular autonomous cell for completion. Each autonomous cell may act independently from the other autonomous cells in processing a print job. Print jobs may be partitioned into smaller-sized lots that are concurrently processed by autonomous cells in order to optimize the efficiency and throughput of each autonomous cell. Moreover, multiple print jobs may be processed concurrently by an autonomous cell, and multiple print jobs may be executed concurrently by multiple autonomous cells in parallel.

Print shop resources may be intelligently divided into autonomous cells. An analysis is made of print jobs that are typically performed by a print shop. Each type of print job is classified into a print job class according to the resources required to execute it. A print job class may be depicted graphically as a set of operations that are connected by edges representing the sequence of flow of operations in the print job. The capacity of each of the pieces of equipment or stations in the print shop to perform operation is determined. The capacity for each print job class needed to meet the customer requirements is determined. The print shop resources may then be organized into autonomous cells and used during operation in an optimal fashion.

Figure 1:
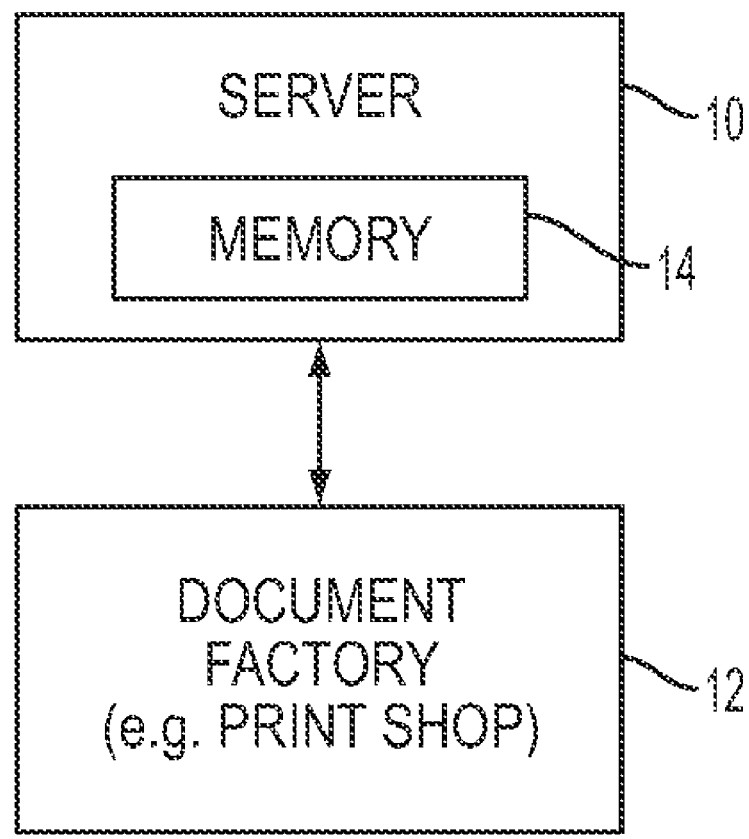
FIG. 1 is a block diagram depicting a configuration management system for a document factory, such as a print shop.

As evidenced by U.S. Pat. No. 7,051,328 B2 to Rai et al., the pertinent portions of which are incorporated herein by reference, and U.S. patent application Ser. No. 10/052,505 by Rai et al. (filed on Jan. 11, 2002 (published as 20030149747 on Aug. 7, 2003)), the pertinent portions of which are incorporated herein by reference, a suitable server (designated with the numeral 10 in FIG. 1) can be used to coordinate production of document processing jobs in a document factory (such as a print shop—designated by the numeral 12 in FIG. 1), and exploit production techniques to control document processing jobs. The server can be run on a number of different platforms, including but not limited to UNIX, Windows or Window NT based-platform, such as a server computer system. The server, being operatively associated with a suitable amount of memory 14 (FIG. 1), determines workflow priorities and manages workflow accordingly. It should be understood that "memory," as that term is used herein, refers to all forms of storage, including volatile as well as non-volatile memory. Moreover, as contemplated, the memory includes all forms of memory that can be associated with the server, including portable and non-portable forms of memory. Finally, the server can, with inputs regarding cell number and equipment types (from, for instance, the CPSC from FIG. 14) develop a print shop configuration in accordance with the framework described below with respect to FIGS. 2-5.

As follows from the description above-mentioned with respect to U.S. patent application Ser. No. 09/706,430 by Rai et al., sound document production principles can be employed to configure print shops so that flows and efficiencies are acceptable. It will be appreciated by those skilled in the art of production design that the term "flow" is sometimes associated herein with volumetric rate. However, it should be understood that generating or developing print shop configurations, such that efficiency and job scheduling is optimized, can present a significant problem. In particular, the ways in which equipment can be combined in a print shop to make a cellular system may be expressed as:

$$(C+1)^S$$

where, C is the number of cells and S is the number of unassigned stations (or equipment types)

The "+1" represents the fact that a station can be in a cell or unassigned. Thus, if a shop contains eighteen pieces of equipment and is expected to have three cells, then the number of potential shop configurations is $4^{18}$.

As described in further detail below, one of the disclosed embodiments relates to an approach for determining an optimum print shop configuration by searching (and thereby listing) all potential configurations for a given print shop, and using a selected criterion for determining the optimal one of the potential configurations. It should be appreciated that, in some instances, it may be desirable to use a criterion that includes a combination of two or more criteria. A print shop configuration designer ("user") may wish to constrain the configuration search by (1) determining maximum cell count, and (2) choosing to associate selected pieces of equipment with certain cells. By constraining the search, the user can reduce the number of equipment combinations required, and reduce the search space employed. As will appear, the user determines the criterion on which each configuration will be judged. Some examples of potential criteria include:

Late jobs percent
Average Earliness
Average Lateness
Average PCE
Average Turnaround Time (TAT)
Average VAT
Average PRT
Average Station Utilization
A Cost Factor including a Weighted Rating (with multiple criteria)

Before proceeding with a description of an application for determining an optimum print shop configuration, it would be helpful to understand two theoretical approaches underlying such application. In the first theoretical approach, searching technique is improved by reducing the number of configurations considered through eliminating equivalent print shop configurations, and in the second theoretical approach, searching technique is improved by reducing the number of configurations considered through eliminating irrelevant print shop configurations.

Referring initially to the first theoretical approach, the stations in a cell of a print shop are each capable of performing one or more functions at a rate known as the throughput. Each job requires one or more functions, and it is likely that many jobs processed in a print shop can be grouped in sets requiring the same, or at least common, functionality. A vector, representing common functionality, may be constructed, and each component of the vector may correspond to a function.

If the functionality vector (see below) represents the functionality present in a cell, then the magnitude of the component in the vector is equal to the sum of the throughputs of all of the machines in the shop that are capable of providing that functionality.

$$\vec{C} = (C_1, C_2, \ldots, C_k)$$

where, C is the vector representing the functionality of the cell in the vector space defined by the functionality in the shop.

Each function in the print shop is a different dimension in the vector space, and the magnitude of C in any given direction k corresponds to the throughput of the function (k) in that cell C. Thus, $C_k$ is the sum of the throughput of all machines that can perform functionality "k" in the cell represented by the vector C. Accordingly, in order to determine whether two print shop configurations are essentially equivalent, it is sufficient to compare the vectors that represent their functionality, component by component. If the magnitude of each component of the two vectors differs by less than some tolerance (possibly around 10%), then the two print shop configurations may be considered to be functionally equivalent.

Cell configurations can be grouped together on the basis of equivalency. After an optimum group is determined, each configuration in its group will be analyzed to determine how to optimize within the group. For purposes of determining optimum cell configuration, only one configuration per group need be analyzed. Determining which member of the group to analyze is an ill-defined problem because it is difficult to predict, a priori, which member of the group is most representative (or best performing). Therefore, pursuant to the description of the application below, it will be assumed that the tolerance is set in such a manner that performance of all members of the group is roughly similar. Accordingly, which member of the group is simulated becomes unimportant.

The second theoretical approach uses the theoretical underpinning of the above-described functionality vector in conjunction with a job requirement related vector. In particular, if the functionality vector represents a print job, then the magnitude of the component of the vector represents the quantity of work required by that job from that functionality, $$\vec{J} = (J_1, J_2, \ldots, J_k)$$

where, J is the vector representing the functionality requirements of the job and $J_k$ is the specific requirement of functionality "k".

As contemplated by the disclosed embodiments, determining whether a given print shop configuration is relevant can be achieved by comparing the functionality vector of each cell in a print shop with each job to be printed at the shop. Comparing a cell to a job may be done without respect to throughputs, i.e., to the magnitudes of the vector components. Rather, the comparison can simply focus on whether the cell has the functionality to produce the job, i.e., a nonzero magnitude for any component of the vector. Various criteria for "relevancy" are contemplated. For instance, a cell might be deemed relevant if it were capable of printing either (1) one of the most common jobs processed at a given shop, or (2) some fraction of the total jobs processed at the given print shop. As will be appreciated by those skilled in the art, various other criteria, in which requirements for a job are compared with the functionality of a cell, could be employed. The jobs selected for comparison might include, for instance, a preset number of jobs (e.g., five jobs) processed most by the shop or a selected percentile (e.g. top 20 percentile) of jobs processed by the shop. The types of jobs processed can be ordered by "flow", pages, or some other objective criterion.

In the disclosed embodiments, relevancy is assessed on a cell-by-cell basis even though many encountered configurations include multiple cells. It follows that the relevancy of a given configuration might hinge on either the (1) relevancy of each cell associated with the given configuration, or (2) collective relevancies of the given configuration's associated cells. While the approach disclosed herein considers the relevancy of each cell in determining relevancy of a given configuration, the disclosed embodiments also contemplate an approach in which collective relevancies of a given configuration are used to determine configuration relevancy.

Referring now to FIGS. 2-5, concepts applicable to the development of an optimal print shop configuration are shown in the form of a series of flow charts. As will be appreciated by those skilled in the art, these concepts can readily be implemented on the server 10 of FIG. 1 (also referred to herein as a print shop configuration manager ("manager")). Referring first to 20 in FIG. 2, the manager can, based on input regarding the number of cells (C) desired and available equipment or stations (S), enumerate or generate a list of all possible print shop configurations. Prior to enumeration, a station can be either allocated (i.e., designated for use in one or more of the available cells) or unallocated. To the extent a station is allocated, the number of possible print shop configurations will be reduced in number.

As mentioned above, the number of possible configurations can be very large. Hence, prior to assessing which configuration might be optimal for a given print shop setting (FIG. 5), one or two subroutines can be employed (via the flow charts of FIGS. 3 and 4) to significantly reduce or prioritize the list of possible print shop configurations (hereinafter referred to simply as "list"). In one embodiment, at 22, the configuration development process branches of to relevancy analysis subroutine. Pursuant to branching off to the relevancy analysis, the list of possible configuration is made available.

Figure 3:
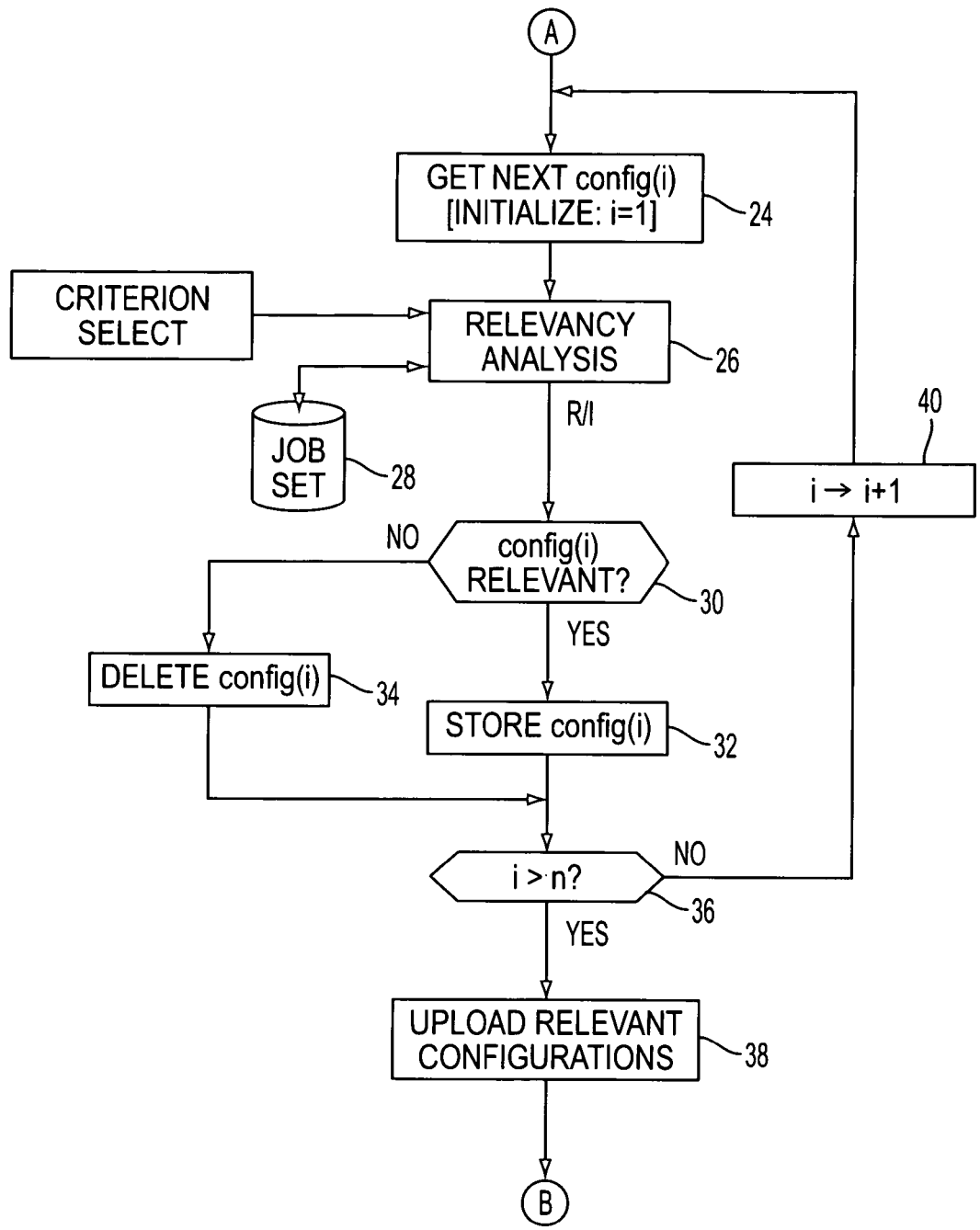
FIG. 3 is a flow chart illustrating a relevancy determining process used in the context of obtaining a job processing configuration.

Referring specifically to FIG. 3, a parameter, designated as "config(i)" is initialized, at 24, to correspond with the first entry in the list. As is common, "i" serves as an index for the list so that i=1 for the first configuration entry in the list, i=2 for the second configuration entry in the list, and so on. Initially config(1) is communicated to a relevancy analysis process 26. As contemplated, all of the components necessary to analyze relevancy are brought together and considered at the process. In one example, the process 26 generates functionality related information (in the form of C vectors) in accordance with the description above.

The process 26 also has access to inputs such as a "Job Set 28." The Job Set includes all necessary information relating to job types encountered at a given print shop. At least some of the information may be obtained by surveying print shop consumers, or directly from shop job logs. In practice, the process 26 may be further provided with, among other things, a performance requirement, such as flow, pages printed, or some other quantity. In one example of operation, the process 26 ranks the job types for the given print shop based on the performance requirement of the job in order to determine the highest volume of jobs produced by the shop. As will be appreciated, depending on particular requirements of shop consumers, other metrics besides print production may be used as a criterion for determining relevancy.

As should now appear, the process 26 is capable of generating job requirement related information in the form of one or more J vectors. Using the C and J vectors, the process, in one example, compares each cell to each job type to determine whether the cell is "relevant." In this way, the process determines, for each cell, whether it can produce one of the most common job types produced by the shop as a whole. Put simply, if a given set of one or more cells can process a given set of one or more job types in a pre-selected manner, then the configuration corresponding with the given set of one or more cells is deemed relevant. After determining whether a configuration (with its associated cells) is relevant (R) or irrelevant (I), an answer of R or I ("R/I") is provided to sorting function 30.

If the configuration currently under consideration is relevant, then it is stored via 32; otherwise, the same configuration is deleted at 34. At 36, the current position of the index i is checked to determine if the last configuration has been considered. If the last of n configurations has been considered (so that i>n), then the relevant configurations may be uploaded (via 38) for use in the main routine of FIG. 5 (i.e., the relevant configurations are made candidates for evaluation); otherwise, the index is increased by 1 (40) so that the next configuration can be retrieved at 24 and analyzed at 26.

Figure 2:
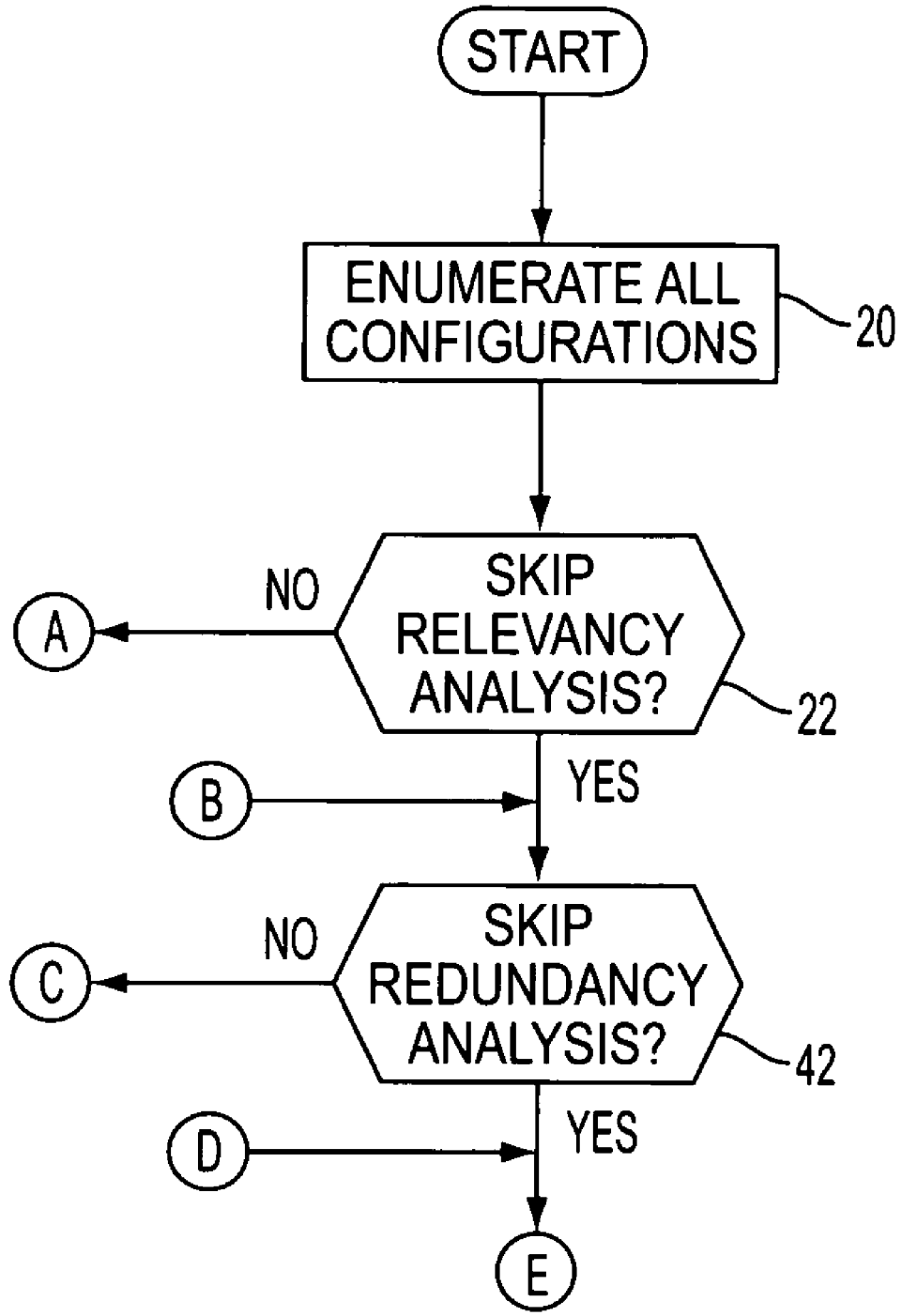
FIG. 2 is a flow chart illustrating steps employed in accessing processes, the processes being used to obtain a job processing configuration.
Figure 4:
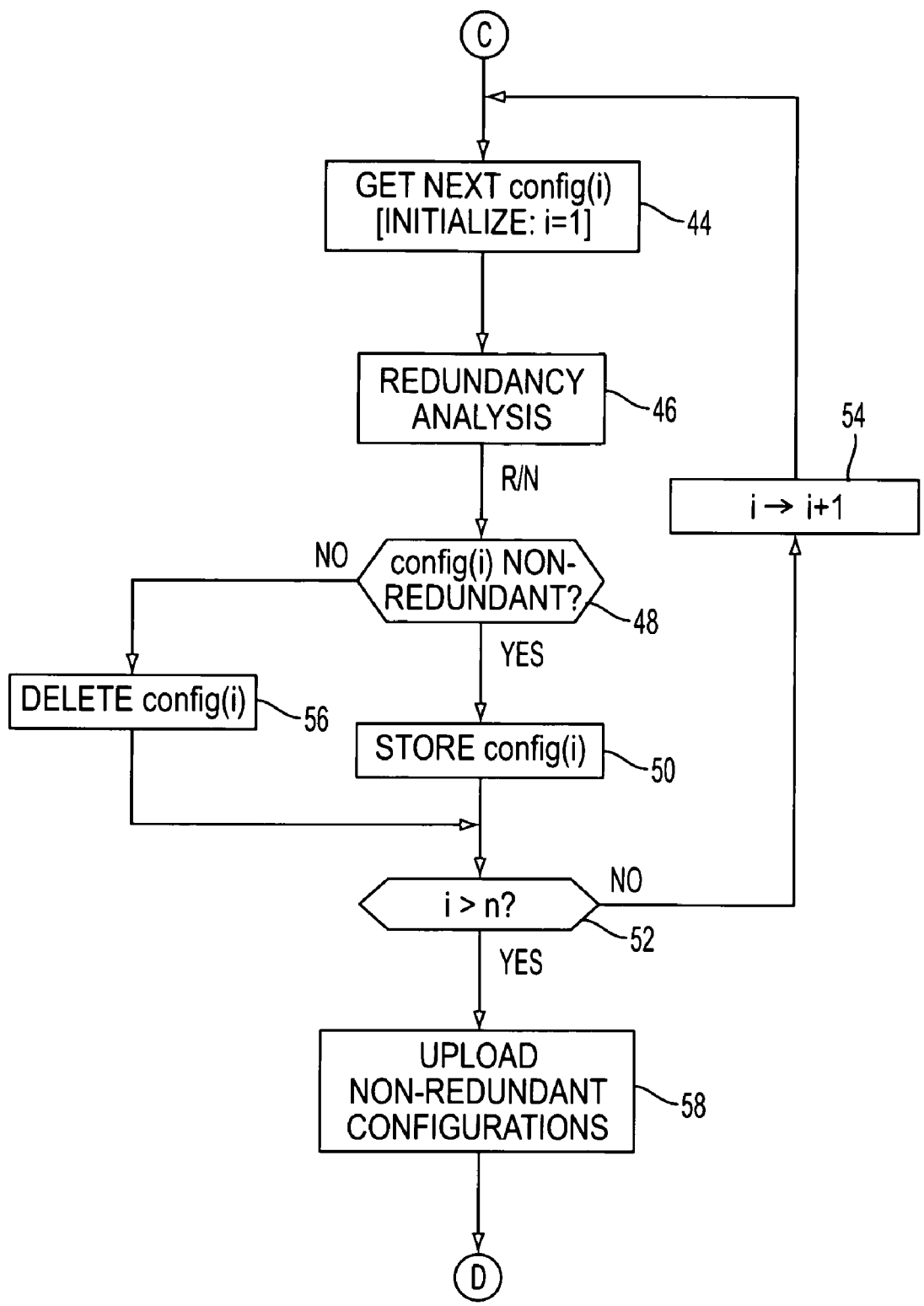
FIG. 4 is a flow chart illustrating a redundancy determining process used in the context of obtaining a job processing configuration.

Returning again to FIG. 2, the need for a redundancy check is considered at 42. Referring to FIG. 4, if a redundancy check is desired, then the process branches to 44. Referring conjunctively to FIGS. 3 and 4, the step at 44 is similar to that at 24, retrieving configuration related information (i.e., information corresponding with "config(i)") sequentially from the list generated at 20 (FIG. 2). Initially config(1) is communicated to a redundancy analysis process 46. As contemplated, all of the components necessary to analyze redundancy (R) and non-redundancy (N) are brought together at the process 46. In one example, the process 46 is capable of generating cell related information for each configuration, in the form of one or more C vectors.

For the initial configuration (config(i)), the process 46 returns a non-redundancy (N) indicator, so that the information is directed from the sorting function 48 to the storage function 50. After storing the information at 50, a check is performed at 52 to determine if all of n configurations have been assessed for redundancy. Assuming the current configuration is not the $n^{th}$ configuration, then the index is increased by 1 (54), and further information regarding the next configuration is obtained at 44.

For a current configuration in which i>1, the redundancy process compares the functionality vector of the current configuration to stored information from each previously considered configuration, in accordance with the description above. In one instance, the process 46 determines which shop configurations are equivalent to each other by determining that they have similar (to within some tolerance) rates of production of the functionalities of each of their cells. As can be understood, since configurations from the above-mentioned list are being compared to one another, it is desirable to save information about each configuration after it has been considered for redundancy. It follows that the saved information can be purged once all of the possible configurations on the list have been considered. Additionally, each redundant configuration may be withheld from consideration (via 56) and non-redundant configurations can be uploaded (58) for use by the routine of FIG. 5 (i.e., the non-redundant configurations are made candidates for evaluation). It should be further noted that, in one exemplary implementation, non-redundant configurations might be placed in one group, while redundant configurations might be placed in another group. In accordance with the description above, selected configurations from the redundant configuration group could then be evaluated (via the routine of FIG. 5) along with possible configurations of the non-redundant configuration group.

Figure 5:
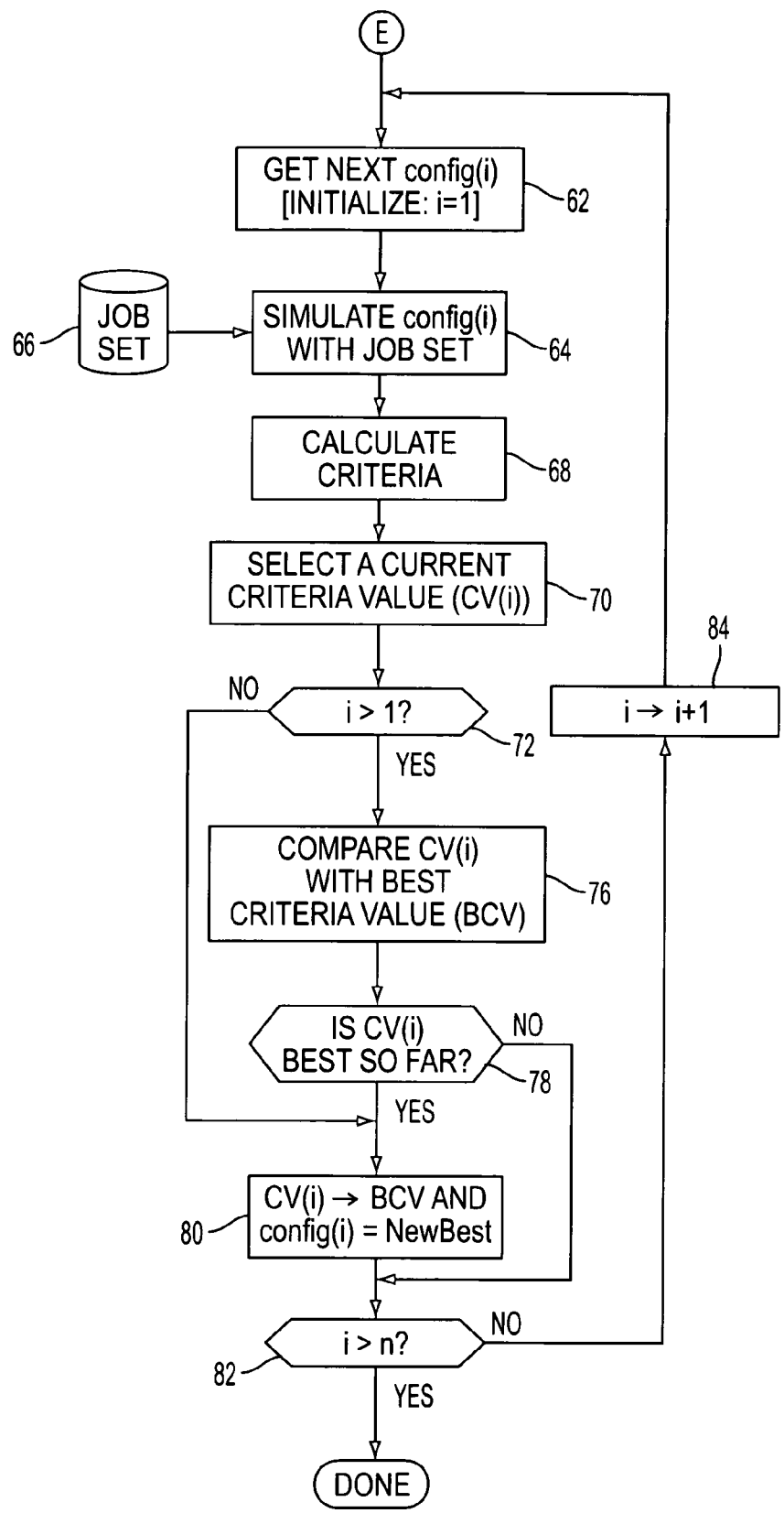
FIG. 5 is a flow chart illustrating process used in obtaining a job processing configuration.

Referring now to FIG. 5, unfiltered or filtered configurations (filtered for relevancy and/or redundancy) may be introduced sequentially at 62. Initially, a simulation of the first configuration (config(1)) is performed at 64 for each job of the job set 66. It should be appreciated that the job set 66 does not typically include all types of jobs executed in a given print shop. In one example, the jobs would merely be representative of those types of jobs commonly processed in the given print shop. As mentioned above, the commonly encountered job types can be obtained from, among other sources, consumer surveys or print shop logs.

After simulating the full job set (i.e., after performing a "complete simulation" for the configuration under consideration), one or more criteria is calculated, at 68, for the current configuration. In one example, one of the calculated criteria may relate to job processing time and, in another example, one of the calculated criteria may relate to resource (factory) utilization or cost. A comprehensive discussion relating to the types of data generated in a document production environment (and hence available criteria) is provided in U.S. patent application Ser. No. 10/946,756, filed Sep. 22, 2004, by Duke et al., Publication No. 20050065830, published on Mar. 24, 2005, the pertinent portions of which are incorporated herein by reference.

Responsive to user input (not shown), at 70, a current criterion value (CV(i)) (from calculated criteria values) is selected. User input may be obtained prior to the examinations of the enumerated configurations, and it is understood that, in practice, the user would choose a criterion type (such as TAT), rather than any particular value. A check at 72 takes into account that CV(1) is initially the best criteria value (BCV) encountered thus far, and that the corresponding configuration is the best configuration encountered thus far (Configu(1)=NewBest). Assuming that i>1, then CV(i) is, at 76, compared with the currently stored BCV. Viewed from one perspective, CV(i) serves as a rating of the configuration under question. The current rank of CV(i) under question can then be obtained by comparing CV(i) to the currently stored BCV.

If, as determined with 78, current CV(i) is the best value obtained thus far (e.g., faster processing time or better utilization of resources), then current BCV, at 80, assumes the value of the current CV(i), at 80, and the corresponding configuration is designated as NewBest. Notwithstanding the answer obtained at 78, a check is performed at 82 to determine if n configurations (the number of configuration in the enumerated list) have been considered. If i>n, then the process is done; otherwise, the value of i is increased by 1, at 84, and the next configuration in the list is retrieved for consideration.

In view of the above description, various features of the disclosed embodiments can be readily comprehended:

I. By applying a criterion to a list of possible print shop configurations, the disclosed print shop development system employs an optimization search, as opposed to a comprehensive iterative one II. The disclosed print shop configuration development system contemplates a simulation with a set of print jobs, the print jobs of the print job set being representative of the types of print jobs most commonly encountered by a given print shop configuration system. Moreover, the set of print jobs may vary as a function of user requirements.

III. A value corresponding with a number of print processing related cells may be selected, and the number of selected print processing related cells to be used in each print shop configuration is stored in a memory. Additionally, user input, indicating which one of two or more stations is to be used in developing at least one of two or more cells, may be stored in memory.

IV. Two approaches may be used to shorten or prioritize a list of all possible print shop configurations: (A) the list may be shortened to eliminate any possible print shop configurations that cannot process selected types of print jobs, and (B) the list may be sorted so that substantially equivalent print shop configurations of the list are classified as belonging in one group and substantially non-equivalent configurations of the list may be classified as belonging in another group.

V. Each time a complete simulation is performed with a possible print shop configuration and a print job set, a configuration rating is given to the possible print shop configuration. In turn, one or more possible print shop configurations can then be rated with obtained configuration ratings.

VI. Many criteria, one which might include print job processing time or cost, can be used to select one of several possible print shop configurations.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print shop configuration system for developing a print shop configuration, the print shop configuration including at least one print processing related cell including at least one print processing related station, comprising:
    (A) a memory for storing a list of substantially all possible print shop configurations that can be formed with at least one print processing related cell and at least one print processing related station, each configuration being described on the list as a vector function having a dimension corresponding to a functionality of the at least one station and a magnitude corresponding to a rate of the at least one station; and
    (B) a print shop configuration manager, said print shop configuration manager operating cooperatively an application for,
        (1) eliminating print shop configurations that cannot process selected types of jobs by comparing the vector function of the each configuration with a second vector function;
        (2) simulating a processing of each print job of a set of print jobs with each possible print shop configuration set forth in the list of substantially all possible print shop configurations,
        (3) calculating a criteria value for each simulation performed in (B)(2), and,
        (4) selecting, with the criteria values calculated in (B)(3), one of the print shop configurations from the list of substantially all possible print job configurations.

2. The print shop configuration development system of claim 1, wherein a value corresponding with a selected number of print processing cells to be used in each print shop configuration is stored in said memory.

3. The print shop configuration development system of claim 1, in which two or more stations are used to develop two or more cells, wherein user input, indicating which one of the two or more stations is to be used in developing at least one of the two or more cells, is stored in said memory.

4. The print shop configuration development system of claim 1, in which a first one of the possible print shop configurations on the list and a second one of the possible print shop configurations on the list are similar in structure, and in which a third one of possible print shop configurations on the list is different in structure than either the first one of the possible print shop configurations on the list and the second one of the possible print shop configurations on the list, wherein, both the first one of the possible print shop configurations on the list and the second one of the possible print shop configurations on the list are classified into a first group for consideration, and wherein the third one of the possible print shop configurations is classified into a second group for consideration.

5. The print shop configuration development system of claim 1, in which a complete simulation occurs each time a set of print jobs has been simulated with one of the possible print shop configurations, wherein each time a complete simulation occurs, a configuration rating is generated for said complete simulation, wherein at least one of the possible print shop configurations is ranked with the configuration ratings.

6. The print shop configuration development system of claim 1, wherein each one of the criteria values varies as a function of print job processing time.

7. A method for developing a print job processing configuration, the print job processing configuration including at least one print job processing related cell including at least one print job processing related station, comprising:
    (A) storing a list of substantially all possible print job processing configurations that can be formed with at least one print job processing related cell and at least one print job processing related station, each configuration being described on the list as a vector function having a dimension corresponding to a functionality of the at least one station and a magnitude corresponding to a rate of the at least one station;
    (B) eliminating print shop configurations that cannot process selected types of jobs by comparing the vector function of the each configuration with a second vector function;
    (C) simulating a processing of each print job of a set of print jobs with each possible print job processing configuration set forth in the list of substantially all possible print job processing configurations;
    (D) calculating a criteria value for each simulation performed in (C); and,
    (E) selecting, with the criteria values calculated in (D), one of the print job processing configurations from the list of substantially all possible print job processing configurations.

8. The method of claim 7, further comprising developing the set of print jobs in such a way that the set of print jobs includes at least one print job representative of the type of print job most commonly encountered by the one of the print shop configurations.

9. The method of claim 7, further comprising providing a value corresponding with a selected number of print processing cells to be used in each print shop configuration.

10. The method of claim 7, in which two or more stations are used to develop two or more cells, further comprising providing user input, the user input indicating which one of the two or more stations is to be used in developing at least one of the two or more cells.

11. The method of claim 7, in which two of the possible print job processing configurations on the list are similar in structure, wherein, prior to performing (C), further comprising categorizing one of the two possible print job processing configurations in a first group and categorizing another one of the two possible print job processing configurations in a second group.

12. The method of claim 7, in which a complete simulation occurs each time the set of print jobs has been simulated with one of the possible print job processing configurations, further comprising generating a configuration rating each time a complete simulation occurs, further comprising ranking at least one of the possible print job processing configurations with the configuration ratings.

13. The method of claim 7, further comprising varying each one of the criteria values as a function of print job processing time.

14. A method for developing a print job processing configuration, the print job processing configuration including at least one print job processing related cell including at least one print job processing related station adapted to perform a function, comprising:
- generating a list of possible print shop cell configurations using inputs regarding a number of cells;
- constructing first function vectors for each of the number of cell configurations, each first function vector having a dimension that is representative of a functionality of a cell and a magnitude that is the sum of all rates known for stations of the cell;
- reducing a list of the cell configurations for consideration using vector comparisons; and,
- running simulations to determine an optimal cell configuration.

15. The method of claim 14, wherein the reducing includes comparing the each first function vector for the number of cell configurations with stored information from at least one previously considered configuration.

16. The method of claim 15, wherein the reducing further includes:
- computing a difference between the each first function vector with the stored information;
- comparing the difference to a tolerance; and,
- eliminating from the list the cell configurations having differences that are greater than the tolerance.

17. The method of claim 14, further including:
- constructing a second function vector representative of a print job, the second function vector having a dimension that is representative of specific requirements of a functionality needed for producing the print job and a magnitude that is representative of a quantity of the print job.

18. The method of claim 17, wherein the reducing includes comparing the first functionality vectors of the each cell configuration with the second functionality vector of the print job.

19. The method of claim 18, further including:
- storing the cell configurations having the first functionality vectors that are similar to the second functionality vector; and,
- deleting the cell configurations having the first functionality vectors that are dissimilar to the second functionality vector.

* * * * *